T. T. KRYSHTOFOVICH.
TRANSMISSION OF ELECTRIC POWER.
APPLICATION FILED APR. 22, 1911.
1,015,196.
Patented Jan. 16, 1912.
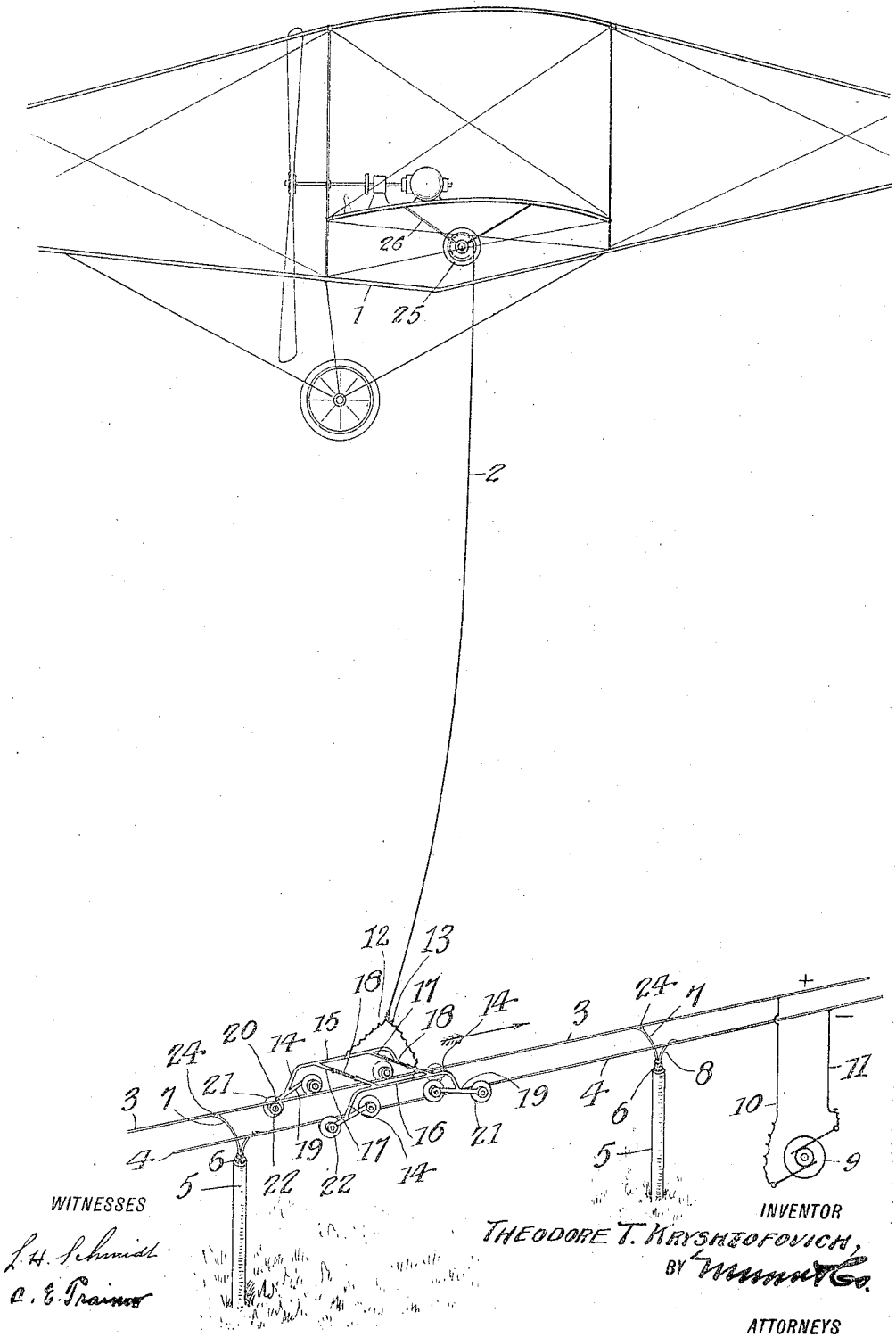

UNITED STATES PATENT OFFICE.

THEODORE T. KRYSHTOFOVICH, OF ST. LOUIS, MISSOURI.

TRANSMISSION OF ELECTRIC POWER.

1,015,196.  Specification of Letters Patent.  Patented Jan. 16, 1912.

Application filed April 22, 1911. Serial No. 622,683.

*To all whom it may concern:*

Be it known that I, THEODORE T. KRYSHTOFOVICH, a subject of the Emperor of Russia, and a resident of St. Louis, in the State of Missouri, have invented a new and Improved Transmission of Electric Power, of which the following is a full, clear, and exact description.

My invention is an improvement in transmission for electric power, and has for its object the provision of a convenient simple means for transmitting an electric current to aerial vehicles.

In the drawings is shown a diagrammatic view of the device.

In the present embodiment of the invention, the vehicle 1 receives its current through a cable 2 from a plurality of conducting wires 3 and 4 supported by poles 5. Each pole 5 is provided at its upper end with a cap 6, having a pair of oppositely arranged diverging arms 7 and 8. The arms 7 of the poles support the wire 3 and the arms 8 support the wire 4.

As shown, the wires are supported in spaced relation and the poles 5 may be of any desired or suitable length. The wires are supplied with current from any suitable form of generating device indicated by the reference character 9 and connected to the wires 3 and 4 by conductors 10 and 11 respectively.

In the drawings the wire 3 is the positive wire and the wire 4 is the negative. The cable 2 is composed of two conductors 12 and 13 which diverge adjacent to the trolley or carriage to be described. The said trolley or carriage consists of a pair of spaced substantially parallel bars 15 and 16 of conducting material, each of which is provided at each end with a downwardly and outwardly extending arm or extension 14. The bars are connected and held in spaced relation by cross bars 17, each of which has interposed in its length and at approximately its center a section 18 of insulating material. Each of the angular arms 14 is provided at its lower end with an integral cross head or bar 19 inclined with respect to the bars 15 and 16 and provided at each end with a journal pin 20. A wheel or disk 21 is journaled on each of the pins 20 and each wheel is provided at each end with a roller 22 for engaging the adjacent wire 3 or 4 as the case may be.

It will be observed that the bars or heads 19 at the adjacent ends of the bars 15 and 16 are inclined in the same direction and in the opposite direction to the bars at the other end. The angle of inclination is such that the roller 22 at the outer end of the bar 19 is below the wire 15 or 16 while the roller at the inner end of the bar is above the wire. The outermost rollers of the trolley or carriage are below the wires 15 and 16 while the innermost rollers are above the wires. The wheels and rollers are of conducting material and the respective sides of the trolley are insulated from each other by the sections 18. The carriage is in fact composed of two connected sections insulated from each other. The arrangement of the rollers prevent the carriage being drawn upwardly or downwardly by the vehicle, and the wheels 21 prevent any lateral movement of the carriage. As shown the wire 12 of the cable is connected to the bar 15 while the wire 13 is connected to the bar 16. The carriage is free to travel on the wires 3 and 4 as indicated by the arrow and travels with the vehicle. The bars or cross heads 19 are outside of the wires and it will be noticed that each arm 7 and 8 is provided with a longitudinal portion 24 adjacent to the wire so that the arm will not interfere with the movement of the carriage. The carriage may travel freely with the vehicle but cannot leave the conducting wires and the current passes from wire 3 to and through bar 15 and wire 12 to the motor of the vehicle, and returns by way of wire 13, bar 16 and wire 4 to the generator. The upper end of the cable is preferably wound on a spring reel 25 which is journaled in brackets 26 on the vehicle so that there can be no danger of straining any of the parts by sudden changes of position on the part of the vehicle.

I claim:—

1. In combination with the spaced conducting wires, and the means for supporting the same, of an aerial vehicle provided with an electric motor, a reel journaled on the vehicle and a cable winding on the reel and composed of two wires insulated from each other, a trolley running on the conductor wires and comprising a section for each wire and insulated from the other section, said trolley comprising a pair of spaced substantially parallel bars of conducting material, each bar being on the outer side of a conducting wire and having a downwardly and outwardly extending arm at each end, an inclined cross bar at the free end of each arm, the bars at each end of the trolley being inclined in the same direction and in the opposite direction to the bars at the other end, each of the said cross bars having an inwardly extending lateral journal pin at each end, a disk on each pin, and a roller on each face of the disk and coaxial therewith and engaging the adjacent conducting wire, the outermost rollers of the trolley engaging beneath the wires and the innermost rollers engaging above the wires, cross bars connecting the first-named bars and a section of insulating material interposed in each cross bar intermediate its ends.

2. In combination with the spaced conducting wires, and the means for supporting the same, of an aerial vehicle provided with an electric motor, a reel journaled on the vehicle and a cable winding on the reel and composed of two wires insulated from each other, a trolley running on the conducting wires and comprising a section for each wire and insulated from the other section, said trolley comprising a pair of spaced substantially parallel bars of conducting material, each bar being on the outer side of a conducting wire and having a downwardly and outwardly extending arm at each end, an inclined cross bar at the free end of each arm, the bars at each end of the trolley being inclined in the same direction and in the opposite direction to the bars at the other end, each of the said cross bars having an inwardly extending lateral journal pin at each end, a disk on each pin, and a roller on each face of the disk and coaxial therewith and engaging the adjacent conducting wire, the outermost rollers of the trolley engaging below the wires and the innermost rollers engaging above the wires, and means for connecting the first-named bars and insulating them from each other.

3. In combination with the spaced conducting wires, and the means for supporting the same, of an aerial vehicle provided with an electric motor, a reel journaled on the vehicle and a cable winding on the reel and composed of two wires insulated from each other, a trolley running on the conducting wires and comprising a section for each wire and insulated from the other section, said trolley comprising a pair of spaced substantially parallel bars of conducting material, each bar being on the outer side of a conducting wire and having a downwardly and outwardly extending arm at each end, an inclined cross bar at the free end of each arm, the bars at each end of the trolley being inclined in the same direction and in the opposite direction to the bars at the other end, each of the said cross bars having an inwardly extending lateral journal pin at each end, a disk on each pin, and a roller on each face of the disk and coaxial therewith and engaging the adjacent conducting wire, and means for connecting the first-mentioned bars and insulating them from each other.

4. In combination with the spaced conducting wires, and the means for supporting the same, of an aerial vehicle provided with an electric motor, a reel journaled on the vehicle and a cable winding on the reel and composed of two wires insulated from each other, a trolley running on the conductor wires and comprising a section for each wire and insulated from the other section, said trolley comprising a pair of spaced substantially parallel bars of conducting material, each bar being on the outer side of a conducting wire and having a downwardly and outwardly extending arm at each end, an inclined cross bar at the free end of each arm, the bars at each end of the trolley being inclined in the same direction and in the opposite direction to the bars at the other end, each of the said cross bars having an inwardly extending lateral journal pin at each end, a roller on each pin engaging the adjacent conducting wire, the outermost rollers of the trolley being below the innermost rollers above the wires, and means for connecting the first-named bars and insulating them from each other.

5. In combination with the spaced conducting wires, and the means for supporting the same, of an aerial vehicle provided with an electric motor, a reel journaled on the vehicle and a cable winding on the reel and composed of two wires insulated from each other, a trolley running on the conducting wires and comprising a section for each wire and insulated from the other section, said trolley comprising a pair of spaced substantially parallel bars of conducting material, each bar being on the outer side of a conducting wire and having a downwardly and outwardly extending arm at each end, an inclined cross bar at the free end of each arm, the bars at each end of the trolley being inclined in the same direction and in the opposite direction to the bars at the other end, a roller journaled on the end of each cross bar and engaging the adjacent wire, and means for connecting the first-named bars and insulating them from each other, the outermost rollers of the trolley engaging above the wires and the innermost rollers engaging below the wires.

6. In combination with the spaced conducting wires, and the means for supporting the same, of an aerial vehicle provided with an electric motor, a reel journaled on the vehicle and a cable winding on the reel and composed of two wires insulated from each other, a trolley running on the conducting wires and comprising a section for each wire and insulated from the other section, said trolley comprising a pair of spaced substantially parallel bars of conducting material, each bar being on the outer side of a conducting wire and having a downwardly and outwardly extending arm at each end, an inclined cross bar at the free end of each arm, the bars at each end of the trolley being inclined in the same direction and in the opposite direction to the bars at the other end, a roller journaled on the end of each cross bar and engaging the adjacent wire, and means for connecting the first-named bars and insulating them from each other.

7. In combination with the spaced conducting wires, and the means for supporting the same, of an aerial vehicle provided with an electric motor, a reel journaled on the vehicle and a cable winding on the reel and composed of two wires insulated from each other, a trolley running on the conducting wires and comprising a section for each wire and insulated from the other section, and a plurality of series of rollers journaled on each section of the trolley, the rollers of one series engaging below the wires and the rollers of the other engaging above the wires, and a flange on each roller for preventing lateral displacement thereof.

8. In combination with the spaced conducting wires, and the means for supporting the same, of an aerial vehicle provided with an electric motor, a reel journaled on the vehicle and a cable winding on the reel and composed of two wires insulated from each other, a trolley running on the conducting wires and comprising a section for each wire and insulated from the other section, and a plurality of series of rollers journaled on each section of the trolley, the rollers of one series engaging below the wires and the rollers of the other engaging above the wires.

9. In combination with the spaced conducting wires, and the means for supporting the same, of an aerial vehicle provided with an electric motor, a reel journaled on the vehicle, and a cable winding on the reel and composed of two wires insulated from each other, a trolley running on the conducting wires and composed of a section for each wire, the sections being insulated from each other, and rollers on each section engaging above and below the wires.

In testimony whereof I have signed my name to this specification in the presence of two subscribing witnesses.

THEO. T. KRYSHTOFOVICH.

Witnesses:
E. B. ELARE-HARDY,
E. C. STEELE.